(12) United States Patent
Toyohara et al.

(10) Patent No.: US 8,862,367 B2
(45) Date of Patent: Oct. 14, 2014

(54) CONTROL SYSTEM OF INTERNAL COMBUSTION ENGINE

(75) Inventors: Masahiro Toyohara, Hitachiota (JP); Yoshihisa Fujii, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 13/288,438

(22) Filed: Nov. 3, 2011

(65) Prior Publication Data
US 2012/0116654 A1 May 10, 2012

(30) Foreign Application Priority Data
Nov. 4, 2010 (JP) ................................ 2010-247679

(51) Int. Cl.
| | |
|---|---|
| F02D 41/30 | (2006.01) |
| F02D 41/26 | (2006.01) |
| F02D 41/40 | (2006.01) |
| F02D 41/00 | (2006.01) |
| F02D 41/20 | (2006.01) |
| F02D 41/24 | (2006.01) |

(52) U.S. Cl.
CPC ............ *F02D 41/402* (2013.01); *F02D 41/005* (2013.01); *F02D 2041/2034* (2013.01); *F02D 41/2454* (2013.01); *F02D 41/2438* (2013.01); *F02D 2041/2058* (2013.01); *Y02T 10/44* (2013.01); *F02D 41/20* (2013.01); *F02D 41/247* (2013.01); *F02D 2041/2055* (2013.01)
USPC ......................................... 701/104; 123/478

(58) Field of Classification Search
CPC ... F02D 41/005; F02D 41/20; F02D 41/2438; F02D 41/2454; F02D 2041/2034; F02D 2041/2055; F02D 2041/2058
USPC ........... 123/478, 480, 486, 490; 701/103, 104
See application file for complete search history.

(56) References Cited

U.S. PATENT DOCUMENTS 5,845,624 A * 12/1998 Ajima ........................... 123/494
6,116,227 A 9/2000 Yoshioka et al.
(Continued)

FOREIGN PATENT DOCUMENTS

| | | |
|---|---|---|
| JP | 6-257497 A | 9/1994 |
| JP | 8-284716 A | 10/1996 |

(Continued)

OTHER PUBLICATIONS

Japanese Office Action dated Oct. 8, 2013 (four (4) pages).

*Primary Examiner* — Thomas Moulis
*Assistant Examiner* — Elizabeth Hadley
(74) *Attorney, Agent, or Firm* — Crowell & Moring LLP

(57) ABSTRACT

The present invention provides a control system for an internal combustion engine capable of, in a case where fuel is injected from an injector for a plurality of times in a divided manner based on an operation status of the internal combustion engine, controlling an injection quantity of the injector accurately in light of variation in an injection quantity of the injector based on air-fuel ratio accuracy, while preventing performance deterioration of the internal combustion engine caused by the injection of fuel. An internal combustion engine control system of the present invention includes an injector for making a valve operate and injecting fuel by applying an excitation current to a coil and injecting fuel into a combustion chamber directly in a manner dividing into a plurality of times of fuel injection, the internal combustion engine control system includes means for determining invalid and valid pulse widths of the injector.

10 Claims, 13 Drawing Sheets

(56) References Cited

U.S. PATENT DOCUMENTS

| | | | |
|---|---|---|---|
| 6,244,241 B1 * | 6/2001 | Mamiya et al. | 123/295 |
| 6,760,657 B2 * | 7/2004 | Katoh | 701/104 |
| 7,552,709 B2 * | 6/2009 | Fujii | 123/299 |
| 8,437,944 B2 * | 5/2013 | Hirata | 701/104 |
| 2006/0090733 A1 | 5/2006 | Fujii | |
| 2009/0308367 A1 * | 12/2009 | Glugla | 123/575 |
| 2011/0060515 A1 * | 3/2011 | Hirata | 701/106 |

FOREIGN PATENT DOCUMENTS

| | | |
|---|---|---|
| JP | 10-196436 A | 7/1998 |
| JP | 2000-234549 A | 8/2000 |
| JP | 2006-125371 A | 5/2006 |
| JP | 2011-179389 A | 9/2011 |

* cited by examiner

PRIOR ART

CONTROL SYSTEM OF INTERNAL COMBUSTION ENGINE

BACKGROUND OF THE INVENTION

1. Field of the Invention

The present invention relates to a control system of an internal combustion engine.

2. Background Art

An internal combustion engine is provided with a fuel injection control system which performs calculation of an appropriate fuel injection quantity according to an operation status, and, based on a result of the calculation, drives an injector for injecting fuel. This injector performs opening and closing of a valve constituting the injector by magnetic force generated by applying a current to a built-in coil so that the injector can keep an opened state and a closed state, and performs injection of fuel according to the valve-open period. An amount of injected fuel is determined mainly by a differential pressure between a fuel pressure and an atmosphere pressure of the nozzle hole part of the injector, and a time period during which the valve is kept in the open state to inject fuel. Accordingly, in order to perform fuel injection of an appropriate amount, it is necessary to set a time period during which the valve open state of the injector is kept according to a fuel pressure and perform the open and close operation of the valve quickly and accurately.

Also, in fuel injection to the internal combustion engine, although it is general to perform injection once per time of combustion, it is known that, by injecting a required amount of fuel injection in a manner dividing it into small amounts of fuel and performing injection for several times, homogeneous mixture formation and mixture formation with atomized fuel can be realized in formation of an air-fuel mixture in a combustion chamber, resulting in improvement of stability of an idling operation and purification of exhaust gas as well as improvement of output power. FIG. 19 indicates an example of this relation. As shown, along with increase of the number of times of fuel injection: atomization of injected fuel from an injector is facilitated; homogeneity of the air-fuel mixture in the combustion chamber is improved; and operation performance and output power of an idling operation is improved by improvement of combustion performance of an internal combustion engine, resulting in suppression of soot from the internal combustion engine.

As above, along with demand for performance improvement of an internal combustion engine, an injector and a fuel injection control system capable of small-amount fuel injection is being desired. However, when performing small-amount fuel injection, because it is necessary to shorten a time period to keep an valve-open state of an injector, the proportion of a time period during which a valve transfers from a valve-close state to a valve-open state and a time period during which it transfers from the valve-open state to the valve-close state (invalid pulse) to this valve-open keeping time becomes large, and, as a result, an error of this invalid pulse exercises a large impact directly on the accuracy of an amount of fuel injection. Therefore, in order to perform fuel injection accurately when injecting fuel for a plurality of times in a dividing manner, the following method that improves accuracy of invalid pulse control of an injector is known.

In JP Patent Publication (Kokai) No. 2006-125371A, as a method to improve accuracy of invalid pulse control, there is disclosed a method that, while performing control to increase a fuel injection pulse width gradually from a sufficiently small fuel injection pulse width with which no fuel is injected, detects a change in a fuel pressure measurement value of a common rail, and identifies a fuel injection pulse width from which fuel injection is started actually.

In JP Patent Publication (Kokai) No. 6-257497A (1994), there is disclosed a method that, when controlling fuel injection in a manner being divided into a plurality of times of injection, stops such multi-time injection and controls as a single injection, and learns an invalid pulse of an injector by a difference in an air-fuel ratio at the time of performing the single injection and an air-fuel ratio at the time of performing the multiple-times injection.

However, in the method disclosed in JP Patent Publication (Kokai) No. 2006-125371A, although, as information related to an invalid pulse of an injector, a position with which an injector transfers to a valve-open state from a valve-close state in the operation status in question can be identified, influence of valve close of the injector or a difference in fuel pressures applied to the injector cannot be determined.

Also, in the method disclosed in JP Patent Publication (Kokai) No. 6-257497A (1994), although, by switching to a single injection when performing divided fuel injection using an injector, invalid pulse related information of the injector can be learned, there is a problem that the performance improvement of an internal combustion engine realized by injecting fuel for a plurality of times in a dividing manner is disturbed.

The present invention is made in view of the above problems, and its object is to provide an internal combustion engine control system capable of controlling a fuel injection quantity accurately without disturbing performance improvement of an internal combustion engine.

SUMMARY OF THE INVENTION

In order to solve the above problems, an internal combustion engine control system according to the present invention is a control system of an internal combustion engine including an injector for making a valve operate and inject fuel by applying an excitation current to a coil and injecting fuel into a combustion chamber directly in a manner dividing into a plurality of times of fuel injection, the internal combustion engine control system includes means for learning an invalid pulse width and a valid pulse width of the injector based on the number of times of fuel injection of the internal combustion engine.

As can be understood from the above description, according to the present invention, also when injecting a required fuel injection quantity of an internal combustion engine in a manner dividing into a plurality of times, accuracy of fuel injection can be maintained or improved without disturbing performance improvement of the internal combustion engine.

Problems, compositions and effects other than the above will be made clear from the description of following embodiments.

BRIEF DESCRIPTION OF THE DRAWINGS

FIG. 13(A) is a diagram illustrating the number of times of fuel injection in time series, (B) a fuel injection pulse width per time, (C) a change of an air-fuel ratio. Further, (D) is a diagram illustrating execution of valid pulse width learning in time series, and (E) execution of invalid pulse width learning.

DETAILED DESCRIPTION OF THE PREFERRED EMBODIMENTS

Hereinafter, embodiments of an internal combustion engine control system according to the present invention will be described with reference to the drawings.

Figure 1:
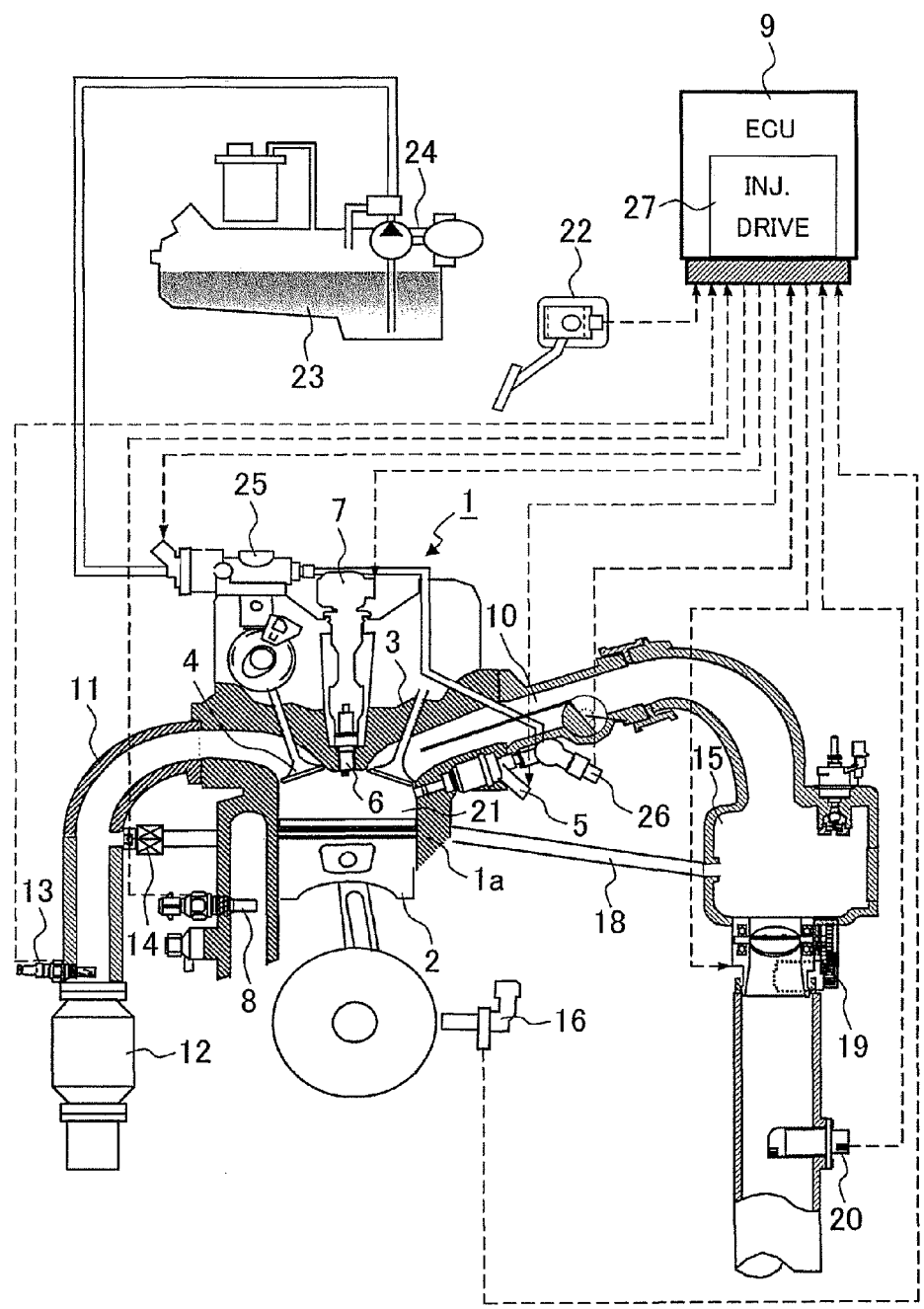
FIG. 1 is a general block diagram of an internal combustion engine to which an embodiment of a control system according to the present invention is applied.

FIG. 1 is a basic block diagram of an internal combustion engine to which a control system according to the present invention is applied, and an internal combustion engine 1 shown in the figure includes a piston 2, an intake valve 3 and an exhaust valve 4. An intake air passes an air flow meter (AFM) 20 and enters a throttle butterfly 19, and then is supplied to an intake pipe 10 via a collector 15 that is a branch part and further to a combustion chamber 21 of the internal combustion engine 1 via the intake valve 3. The fuel is provided from a fuel tank 23 to the internal combustion engine 1 by a low pressure fuel pump 24, and, further by a high pressure fuel pump 25, its pressure is increased to a pressure necessary for fuel injection. Then, the fuel is supplied and injected from an injector 5 to the combustion chamber 21 of a cylinder 1a of the internal combustion engine 1, and ignited by a spark plug 6 using electric power supplied by a sparking coil 7. Here, a pressure of fuel is being measured by a fuel pressure sensor 26. An exhaust gas after combustion is exhausted to an exhaust pipe 11 via an exhaust valve 4, and the exhaust pipe 11 includes a three-way catalyst 12 for cleaning the exhaust gas. Meanwhile, the exhaust pipe 11 and the collector 15 are connected each other via an EGR (Exhaust Gas Recirculation) valve 14 and an EGR path 18, and thus an exhaust gas is mixed to an intake air. In an ECU (Engine Control Unit) 9, a fuel injection control system 27 is incorporated, and signals such as a signal of a crank angle sensor 16, an air quantity signal of the AFM 20, a signal of an oxygen sensor 13 that detects an oxygen density in an exhaust gas, a signal of an accelerator open-rate of an accelerator open-rate sensor 22 and a signal of the fuel pressure sensor 26 are inputted to it. The ECU 9 calculates a required torque to the internal combustion engine from a signal of the accelerator open-rate sensor 22, and performs determination of an idle state and the like. The ECU 9 includes: rotation frequency detection means for calculating the number of rotations of the internal combustion engine from a signal of the crank angle sensor 16; and determination means for determining whether the three-way catalyst 12 is in the warmed-up state or not based on a water temperature of the internal combustion engine obtained from a water temperature sensor 8 and an elapsed time after starting of the internal combustion engine and the like. The ECU 9 calculates an intake air quantity required for the internal combustion engine 1 and outputs an open-rate signal consistent with the required intake air quantity to the throttle butterfly 19, and, in addition, the fuel injection control system 27 calculates a fuel quantity corresponding to the intake air quantity to output a fuel injection signal to the injector 5, and outputs an ignition signal to the spark plug 6.

Figure 2:
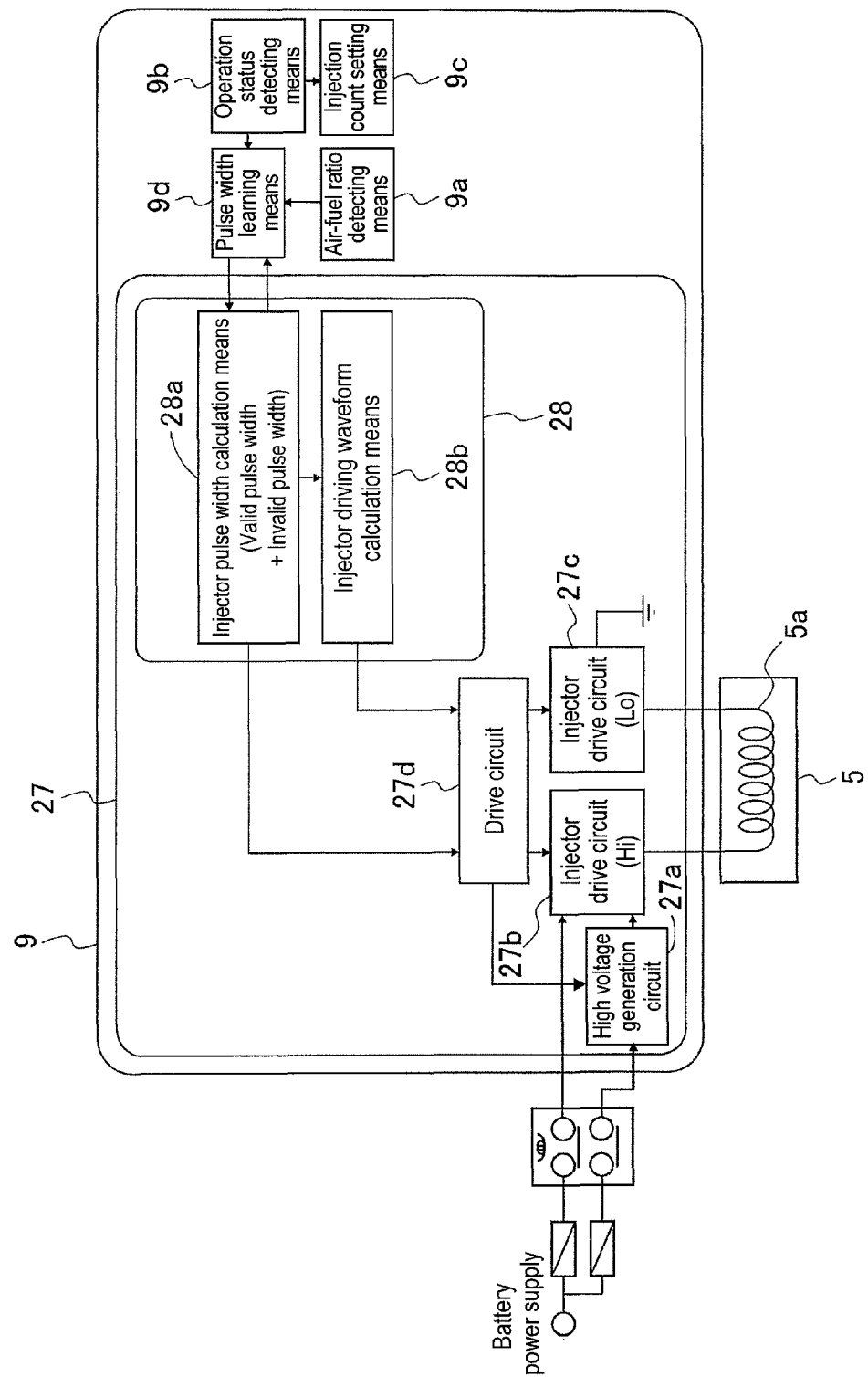
FIG. 2 is a block diagram of an embodiment of a control system according to the present invention.

FIG. 2 indicates an embodiment of a configuration of a control system according to the present invention.

In the ECU 9 that is illustrated, the fuel injection control system 27 is incorporated, and the fuel injection control system 27 includes driving control means 28 for controlling driving of the injector 5. Based on a calculation result of the driving control means 28, a driving pulse is provided to the injector 5 for a plurality of times in a divided manner. Then, by a coil 5a of the injector 5 being applied an excitation current, its valve (not illustrated) is actuated and fuel is injected directly into the combustion chamber 21 of the internal combustion engine 1.

First, provision of an excitation current for actuating the valve of the injector 5 will be described. In a high voltage generation circuit 27a of the fuel injection control system 27, a high supply voltage needed for valve opening of the injector 5 is generated from a battery power of the internal combustion engine. The high supply voltage is converted into a desired supply voltage according to an instruction from a drive circuit 27d for generating a supply voltage. In an injector drive circuit (Hi) 27b, one of the high supply voltage and a low supply voltage which is a battery power is selected, and supplied to the injector 5. When the injector 5 changes from the valve-closed state to the valve-open state, a valve opening current required for valve opening is applied by supplying a high supply voltage, and when keeping the valve-open state of the injector 5, the supply voltage is switched to a battery voltage and a holding current is applied. Similarly to the injector drive circuit (Hi) 27b, an injector drive circuit (Lo) 27c is a drive circuit, provided in the downstream side of the injector 5, for applying a driving current to the injector 5. By being driving-controlled by the drive circuit 27d to which a control signal is inputted from the driving control means 28, the high voltage generation circuit 27a, the injector drive circuit (Hi) 27b and the injector drive circuit (Lo) 27c can supply a desired driving power supply and a driving current (excitation current) to the injector 5 to perform driving control of the injector 5. Here, a driving period (a power applying time period to the injector), a driving power voltage and a driving current of the drive circuit 27d are controlled by a driving current waveform and the like calculated by the driving control means 28.

Next, the driving control means 28 that provides a control signal to the drive circuit 27d and a pulse width inputted to the driving control means 28 will be described. The ECU 9 includes: air-fuel ratio detecting means 9a for detecting an air-fuel ratio of an internal combustion engine; operation status detecting means 9b for detecting an operation status of the internal combustion engine; injection count setting means 9c for setting the number of times of fuel injection (hereinafter, also referred to as a fuel injection count) based on an operation status of the internal combustion engine detected by the operation status detecting means 9b; and pulse width learning means 9d for learning an invalid pulse width. The driving control means 28 includes: pulse width calculation means 28a for, based on a learning result of the pulse width learning means 9d, calculating a pulse width of an excitation current for driving an injector to be valve-opened as valid pulse width corresponding to a fuel injection quantity and invalid pulse width corresponding to a valve opening delay and a valve closing delay of the injector; and driving waveform calculation means 28b for calculating driving waveform of the injector. Meanwhile, as described later, the pulse width learning means 9d can also perform valid pulse width learning as needed. Also, each of valid pulse width and invalid pulse width can be learned by different pulse width learning means. In the pulse width learning means 9d, an amount of change in an air-fuel ratio of the air-fuel ratio detecting means 9a at the time when the number of times of fuel injection has been changed based on an internal combustion engine operation status of the operation status detecting means 9b is learned as an invalid pulse width of the pulse width calculation means 28a. Then, the valid pulse width and the invalid pulse width of the pulse width calculation means 28a are updated, and signals of the updated valid pulse width and the updated invalid pulse width of the injector are outputted to the drive circuit 27d and the driving waveform calculation means 28b. Further, in the driving waveform calculation means 28b, based on the signals of the updated valid pulse width and the updated invalid pulse width and an internal combustion engine operation status of the operation status detecting means 9b, a driving current waveform is calculated and outputted to the drive circuit 27d. In the drive circuit 27d, as already described, the high voltage generation circuit 27a, the injector drive circuit (Hi) 27b and the injector drive circuit (Lo) 27c are controlled based on these calculation results, and driving control of the injector 5 is performed by supplying a driving pulse to the injector 5.

From the above, most suitable driving control of the injector 5 is carried out, and a fuel quantity needed for combustion of the internal combustion engine 1 is supplied to the combustion chamber.

Figure 3:
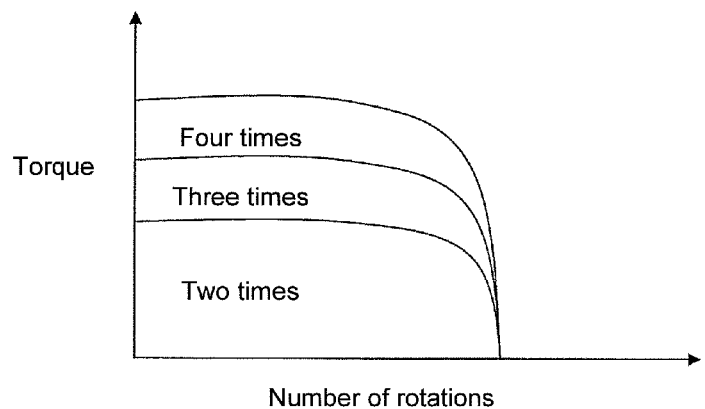
FIG. 3 is a diagram illustrating relation between an operation status and the number of times of fuel injection of an internal combustion engine.

FIG. 3 indicates relation between an operation status of an internal combustion engine and the number of times of fuel injection to be set, and the horizontal axis of this figure shows the number of rotations, and the vertical axis a torque.

In the injection count setting means 9c (refer to FIG. 2) of the ECU 9, based on the relation shown in FIG. 3, for example, the number of times of fuel injection is set from an operation status of an internal combustion engine. Further, it is supposed that the number of times of fuel injection is determined from a requirement for performance improvement of an internal combustion engine, a minimum injection pulse width by which an injector can perform injection accurately, the performance of a fuel injection control system and the like, and is calculated and set in the internal combustion engine control system in advance.

Figure 4:
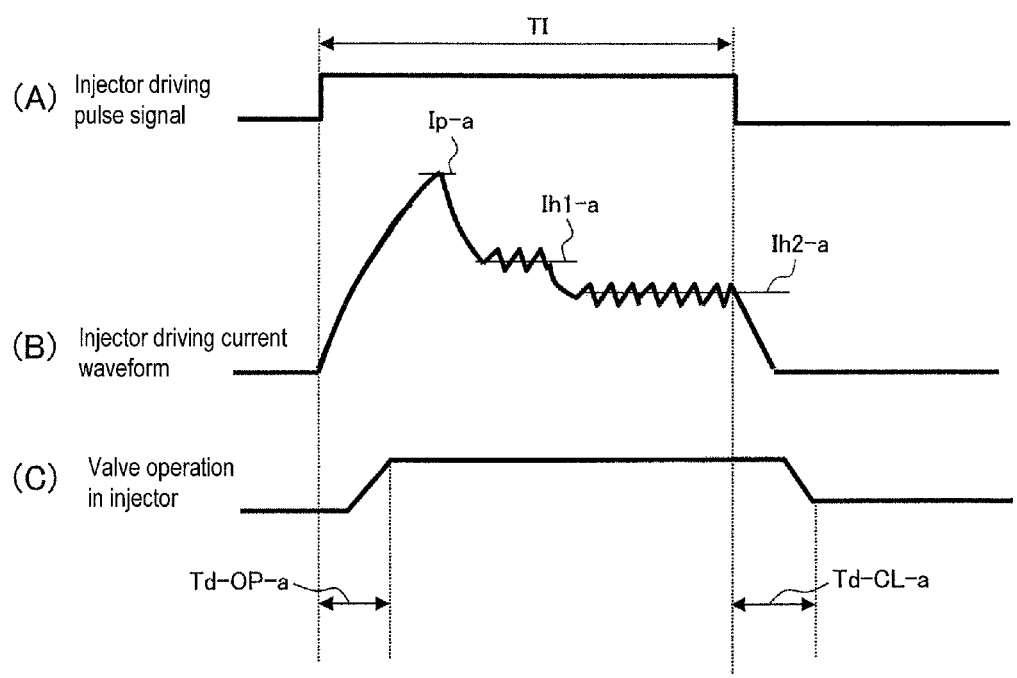
FIG. 4 is a diagram illustrating an example of a time chart of an operation of an injector, and (A) shows an injector driving pulse signal in time series, (B) its driving current waveform, and (C) a valve operation inside the injector.

FIG. 4 indicates an example of a time chart of an operation of an injector, and, with reference to this figure, relation between a pulse width for driving the injector to be opened, a valid pulse width corresponding to a fuel injection quantity, an invalid pulse width corresponding to a valve opening delay and a valve closing delay of the injector will be described. Here, FIG. 4(A) shows an injector driving pulse signal in time series, 4(B) its driving current waveform, and 4(C) a valve operation in an injector.

The injector driving pulse signal of FIG. 4(A) indicates a pulse width (TI) calculated by the pulse width learning means 9d and the pulse width calculation means 28a (refer to FIG. 2). The injector driving current waveform of FIG. 4(B) shows an example of a driving current waveform generated by the high voltage generation circuit 27a, the injector drive circuit (Hi) 27b and the injector drive circuit (Lo) 27c. A valve operation in the injector 5 actuated by an injector driving current waveform based on this injector driving pulse signal is shown in FIG. 4(C). Meanwhile, the upper side of the figure indicates the valve-open state and the lower side the valve-close state. As indicated, the injector completes a valve-open operation after a predetermined time interval (Td-OP-a) after the driving pulse signal has been supplied, and completes a valve-close operation after a predetermined time interval (Td-CL-a) after supply of the driving pulse signal has been stopped. These valve-open time (Td-OP-a) and valve-close time (Td-CL-a) form invalid pulse width of the injector, and a value that is made by subtracting the invalid pulse width from the total pulse width (TI) is controlled as valid pulse width.

Next, with reference to FIG. 5, relation between a fuel injection count, a valid pulse and an invalid pulse under the condition of the same fuel injection quantity will be described. FIG. 5(A) indicates relation between valid pulse width and invalid pulse width when a fuel injection count is set to 1, and FIG. 5(B) shows relation between valid pulse width and invalid pulse width when a fuel injection count is set to 3.

As indicated, along with increase of a fuel injection count, an injection pulse width per time of injection becomes small, increasing proportion of invalid pulse width to an injection pulse width per time. This is caused by invalid pulse width existing for a given time period along with a valve operation of the injector independently of a required injection pulse width.

Figure 5:
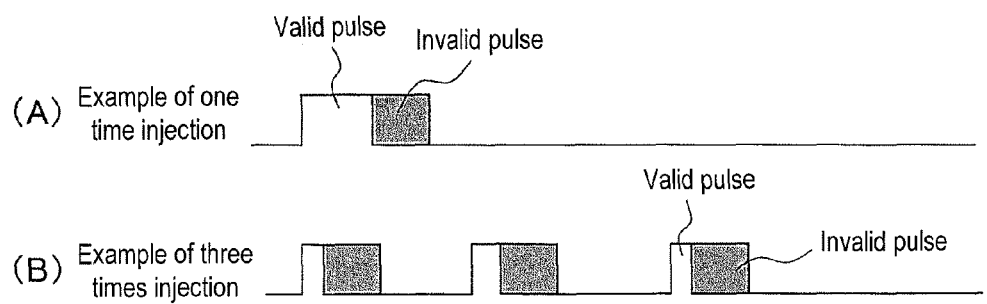
FIG. 5 is a diagram illustrating relation between an valid pulse and an invalid pulse according to a difference in the number of times of fuel injection in the same fuel injection quantity, and (A) is a diagram illustrating relation between a valid pulse and an invalid pulse when making the number of times of fuel injection be 1, and (B) be 3.
Figure 6:
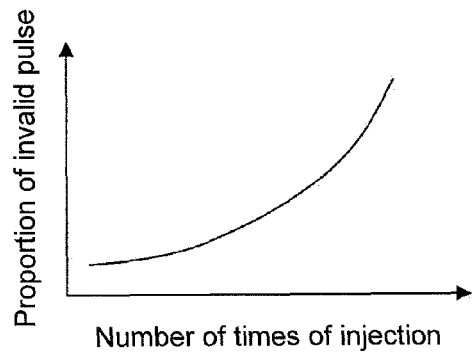
FIG. 6 is a diagram illustrating relation between the number of times of fuel injection and the proportion of an invalid pulse to a fuel injection pulse.

Relation between a fuel injection count and a proportion of an invalid pulse to a fuel injection pulse described in FIG. 5 is indicated by a graph in FIG. 6. As described in FIG. 5, when a fuel injection count is increased, a proportion of an invalid pulse increases further.

Figure 7:
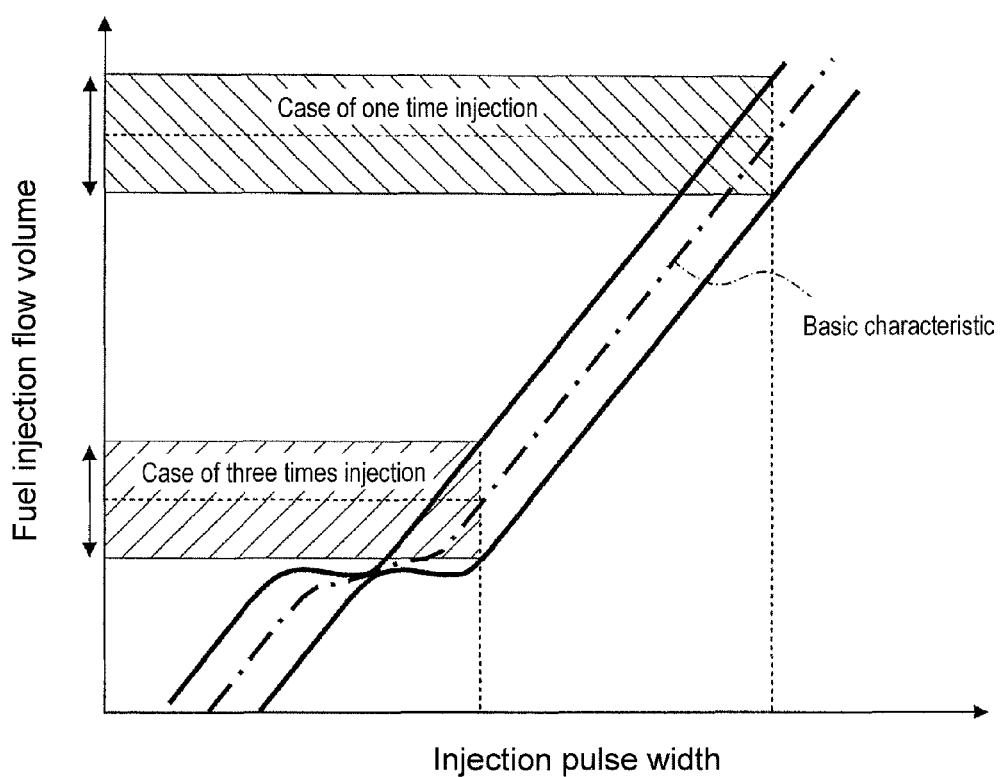
FIG. 7 is a diagram illustrating a flow characteristic of an injector.

FIG. 7 shows an example of a flow characteristic of an injector, and a dashed-dotted line indicates a basic characteristic of the injector, and a solid line in the both sides of the dashed-dotted line indicates a variation of the injector. Here, because such variation of an injector is caused by manufacturing errors and the injector's deterioration with age and is a well known matter, detailed description will be omitted.

In this figure, there is shown relation between a fuel injection pulse width and a fuel injection quantity in the cases of one time injection and three times injection under the same injection quantity condition. As described in FIGS. 5 and 6, also in this figure, relation between a difference in injection pulse widths per time according to a fuel injection count and a proportion of invalid pulse width to the fuel injection pulse width is shown. As shown, along with increase of a fuel injection count, that is, along with decrease of a fuel injection pulse width, a proportion of invalid pulse width is increased, and such difference in fuel injection counts relates to a variation of invalid pulse width associated with the injector. For this reason, in this embodiment, a variation of invalid pulse width of the injector is extracted using this feature to perform learning of invalid pulse width.

Figure 8:
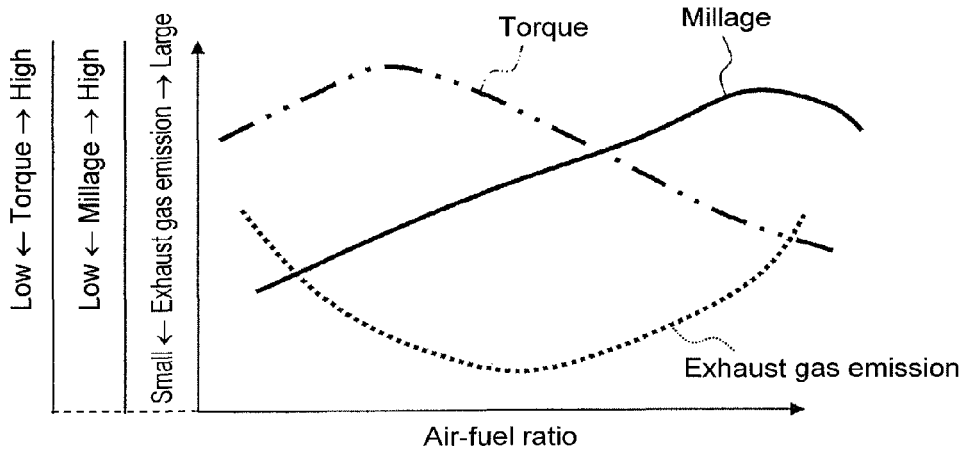
FIG. 8 is a diagram illustrating relation between an air-fuel ratio and performance of an internal combustion engine.

Here, in FIG. 8, relation between an air-fuel ratio and performance of an internal combustion engine is indicated. Although, because the relation in this figure is generally known relation of an internal combustion engine, detailed description will be omitted, it can be seen that, even in the case of dividing fuel injection into a plurality of times of injection, performing air-fuel ratio control of an internal combustion engine accurately is indispensable because it leads to performance improvement of an internal combustion engine.

Figure 9:
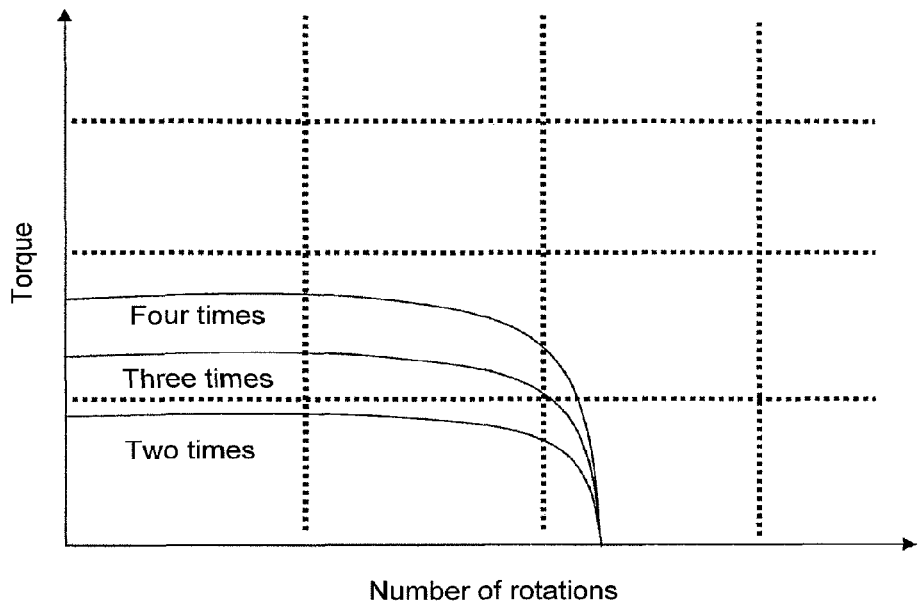
FIG. 9 is a diagram illustrating relation between the number of times of fuel injection and an injector learning map.

Next, FIG. 9 indicates conventional relation between a fuel injection count and an injector learning map, and the fuel injection counts that are shown are an example of injection counts set based on the relation shown in FIG. 3. The grid indicated by a dashed line in the learning map indicates areas assigned for each operation range in order to perform learning of injection quantity of an injector, and a learning grid of an injector and a fuel injection count of an injector have independent relation with each other.

Figure 10:
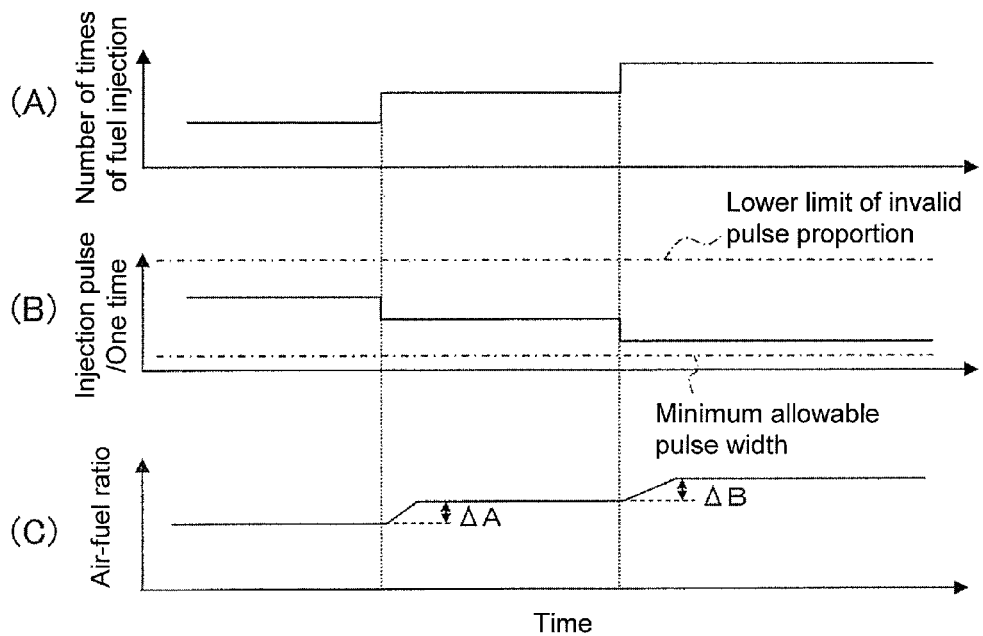
FIG. 10 is a diagram illustrating an example of a time chart of injection quantity learning of an injector according to a change in the number of times of fuel injection, and (A) is a diagram illustrating the number of times of fuel injection in time series, (B) a fuel injection pulse width per time, and (C) a change of an air-fuel ratio.

As indicated, in a case where fuel injection counts differ in the same learning grid area, when there is a variation in invalid pulse widths of an injector, it is not possible to learn an injection quantity of an injector accurately due to relation between a fuel injection count and a proportion of an invalid pulse described using FIGS. 5 to 7. To cope with this, according to the present embodiment, fuel injection accuracy is improved by learning a variation of each of an invalid pulse and a valid pulse of an injector separately while maintaining a desired injection count. With reference to FIG. 10 and subsequent figures, fuel injection control according to the present embodiment will be described.

FIG. 10 indicates an example of a time chart of injection quantity learning of an injector with respect to a change in a fuel injection count according to the present embodiment. Here, FIG. 10(A) indicates a change in a fuel injection count in time series, 10(B) a fuel injection pulse width per time and 10(C) an air-fuel ratio.

As shown in FIGS. 10(A) and 10(B), along with increase of a fuel injection count, a pulse width decreases. Regarding a change in an air-fuel ratio of an internal combustion engine shown in FIG. 10(C), because, in reality, feedback control is carried out by an internal combustion engine control system using a signal of the oxygen sensor 13 (refer to FIG. 1) detecting an oxygen density in an exhaust gas, there is no cases where the air-fuel ratio change as indicated in this figure is maintained. However, for convenience of explanation, it is indicated such that a state where an air-fuel ratio has changed along with a change in a fuel injection count is maintained.

As shown in the figure, when invalid pulse width of an injector varies, each time a fuel injection count is changed, an air-fuel ratio of an internal combustion engine changes as shown by $\Delta A$ and $\Delta B$. In the present embodiment, by correcting such $\Delta A$ and $\Delta B$ (the amount of change in an air-fuel ratio) as invalid pulse width, it becomes possible to learn a variation of invalid pulse width of an injector accurately. Also, the minimum allowable pulse width shown in FIG. 10(B) is a minimum pulse width with which the injector can perform injection accurately, and when a required injection pulse width becomes smaller than the minimum pulse width, invalid pulse width cannot be learned accurately. Accordingly, in such a case, learning of invalid pulse width should simply not be performed. In addition, as will be described later in FIG. 18, the larger a proportion of an invalid pulse to a fuel injection pulse per time (that is, the smaller a fuel injection pulse width per time), the greater the influence of an invalid pulse variation to an air-fuel ratio of an internal combustion engine. Accordingly, it is also possible to arrange such that leaning of invalid pulse width is not performed when a fuel injection pulse width per time is larger than a predetermined value.

In contrast to the conventional injector learning map shown in FIG. 9, an example of grid setting of a fuel injection count and an injector learning map used in the present embodiment will be described with reference to FIG. 11.

As described in FIG. 9, in a conventional injector learning map, because a learning grid of an injector and a fuel injection count of the injector have relation independent from each other, when fuel injection counts differ within the same area sectionalized by the grid, learning of the injector cannot be performed accurately. Therefore, in the learning map shown in FIG. 11, in order to secure learning accuracy of it, aside from correction of invalid pulse width described in FIG. 10, by making a change of a fuel injection count of an injector accord with the learning grid of the injector, learning of a variation of invalid pulse with further higher accuracy is realized. Meanwhile, in the learning map indicated in the figure, a value of each area of the learning map can be set according to a fuel injection count set by the injection count setting means 9c (refer to FIG. 2) based on an operation status of an internal combustion engine. Further, by providing different learning maps for respective fuel injection counts in advance, it is also possible to select and use the most suitable leaning map from these learning maps according to a fuel injection count set based on an operation status of an internal combustion engine.

By this, separation of an invalid pulse and a valid pulse of an injector becomes unnecessary, and in the same way as conventional one time injection, a variation of an invalid pulse can be learned easily. Meanwhile, in this case, because it is necessary to set a learning grid for various kinds of fuel injection count settings, detailed and complex setting of a learning grid is needed compared with a conventional technique.

Figure 11:
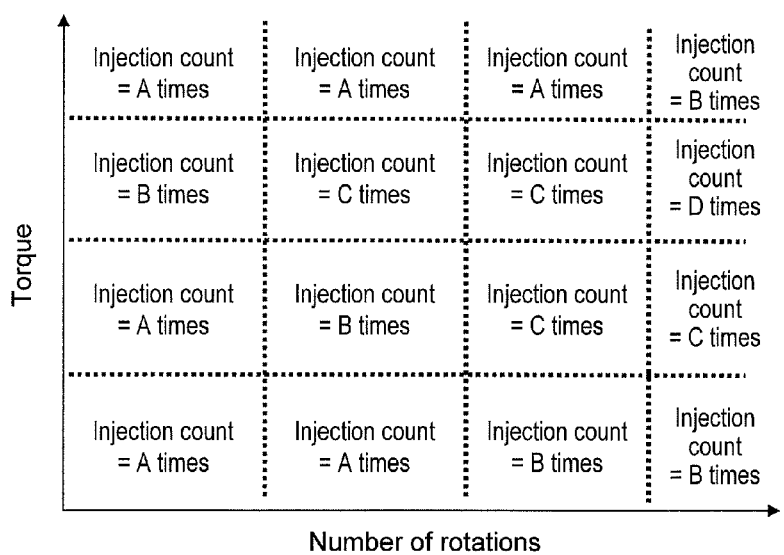
FIG. 11 is a diagram illustrating an example of grid setting of an injector learning map.
Figure 12:
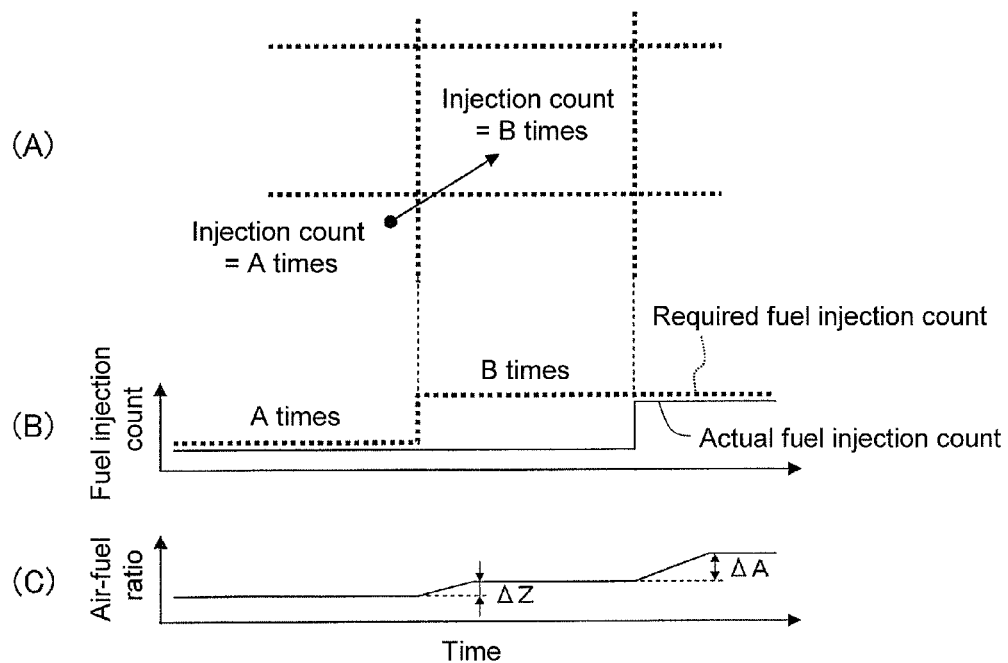
FIG. 12 is a diagram illustrating an example of invalid pulse width learning according to a change in the number of times of fuel injection, and (A) is a diagram illustrating part of a learning map indicated in FIG. 11, (B) is a diagram illustrating the number of times of fuel injection in time series, and (C) is a diagram illustrating a change in an air-fuel ratio in time series.

FIG. 12 indicates an example of invalid pulse width learning according to a change of a fuel injection count using an injector learning map shown in FIG. 11. Here, FIG. 12(A) is a diagram illustrating a part of the learning map shown in FIG. 11, and FIGS. 12(B) and 12(C) are diagrams illustrating a change in a fuel injection count and a change in an air-fuel ratio, respectively, in time series.

The grid shown in FIG. 12(A) indicates the grid of the injector learning map described in FIG. 11. In addition, the arrow in the grid indicates an example of a change in a fuel injection count when an operation status of an internal combustion engine changes. According to the example shown in FIG. 12(A), by an operation status of an internal combustion engine moving from one cell to another cell of the grid, a required fuel injection count of an injector is changed from A times to B times. The dashed line of a fuel injection count in FIG. 12(B) indicates such a required fuel injection count (it is corresponding to an injection count in a cell of the grid), and the solid line indicates an actual fuel injection count performed based on a required injection count. As shown in the figure, even when an operation status of an internal combustion engine changes resulting in a change of a required injection count, a fuel injection count is not changed for a predetermined period and the previous fuel injection count is maintained and continued, and, after the predetermined period, the fuel injection count is changed to the required injection count.

By this, it becomes possible to change a fuel injection count in the same internal combustion engine operation status, and thus an invalid pulse variation component of fuel injection can be extracted more accurately and a difference between an injection count required by an internal combustion engine and an execution requirement count is suppressed to the minimum. Further, a discrepancy (an amount change) $\Delta Z$ of an air-fuel ratio in FIG. 12(C) (a discrepancy of an air-fuel ratio at the time when there is no change in a fuel injection count) is learned as a discrepancy of a valid pulse of an injector, and a discrepancy (an amount change) $\Delta A$ of an air-fuel ratio is learned as a discrepancy of an invalid pulse of the injector as described in FIG. 10, and, as a result, it becomes possible to learn a variation of a pulse more accurately by dividing into factors of a discrepancy of the injector. Here, maintaining and continuing a previous fuel injection count without changing a fuel injection count for a predetermined period is preferable, because, when a state is changed from a small fuel injection count state to a large fuel injection count state, it is possible, thanks to such method, to perform fuel injection for a plurality of times without falling short of a minimum injection amount of the injector, and thus to perform control within a range in which the flow characteristic of an injector is secured. However, in a case where a fuel injection count can be maintained without falling short of the minimum injection amount of an injector, the previous fuel injection count does not need to be maintained and continued.

Figure 13:
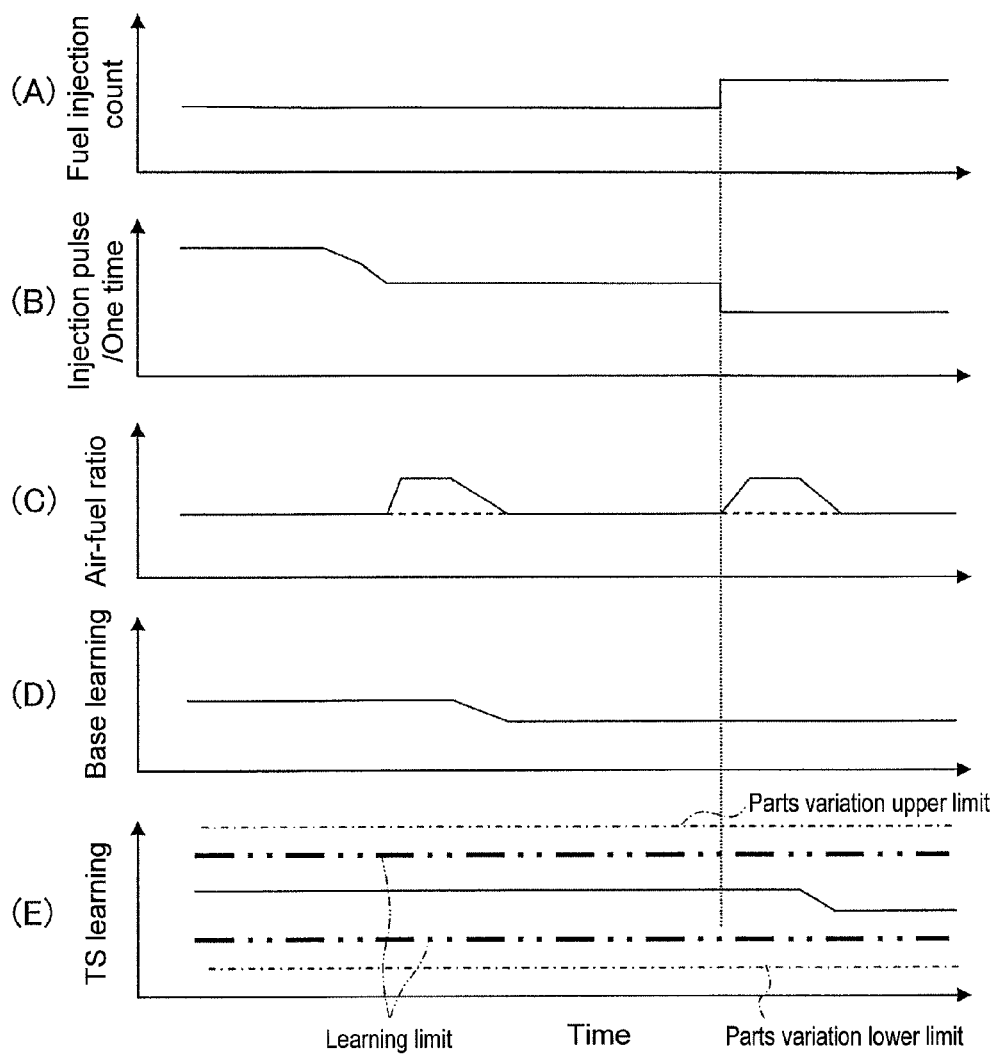
FIG. 13 is a diagram illustrating an example of a time chart of pulse width learning of an injector according to a change in the number of times of fuel injection.

FIG. 13 is a time chart describing an example of pulse width learning of an injector according to a change in a fuel injection count according to the present embodiment described using FIG. 12 further in detail. Here, FIG. 13(A) is a diagram illustrating a fuel injection count in time series, 13(B) a fuel injection pulse width per time, and 13(C) a change in an air-fuel ratio. Further, FIG. 13(D) is a diagram illustrating execution of valid pulse width learning in time series, and 13(E) execution of invalid pulse width learning. Meanwhile, regarding the air-fuel ratio shown in FIG. 13(C), because, as described in FIG. 10, even if an air-fuel ratio of an internal combustion engine is changed temporarily according to its operation status and a fuel injection count, after that, feedback control is performed by an internal combustion engine control system using a signal of the oxygen sensor 13 (refer to FIG. 1) for detecting an oxygen density in an exhaust gas, a change in an air-fuel ratio is suppressed.

An area of the first half of the indicated time chart shows a state where a fuel injection count being applied is not changed and where a change in an air-fuel ratio occurs due to a change in an operation status of an internal combustion engine. In this case, valid pulse width of an injector is learned (it is referred to as "Base learning"). Next, an area of the last half of the time chart indicates a state where a fuel injection count is changed as described using FIG. 12, and, by this, where an air-fuel ratio change occurs. In this case, valid pulse width learning of an injector is not updated, and invalid pulse width learning of the injector (it is referred to as "TS learning") is updated. Here, a parts variation upper limit and a parts variation lower limit shown by a dashed-dotted line of TS learning indicates an invalid pulse variation of an injector caused by a manufacturing error and a change over time. An update limitation (learning limitation) for invalid pulse width learning of the injector is provided so that update of invalid pulse width learning is carried out only within the range of the upper and lower values. By providing such update limitation, learning of an injector is performed only within a predetermined range, and, as a result, an air-fuel ratio is converged on a desired value and an injection quantity of an injector can be controlled accurately.

By performing such methods described using FIGS. 12 and 13, complicated setting of a grid of a learning map described in FIG. 11 becomes unnecessary, and, also in an internal combustion engine control system of the present invention which performs fuel injection for a plurality of times, learning of an injector can be performed more accurately.

Figure 14:
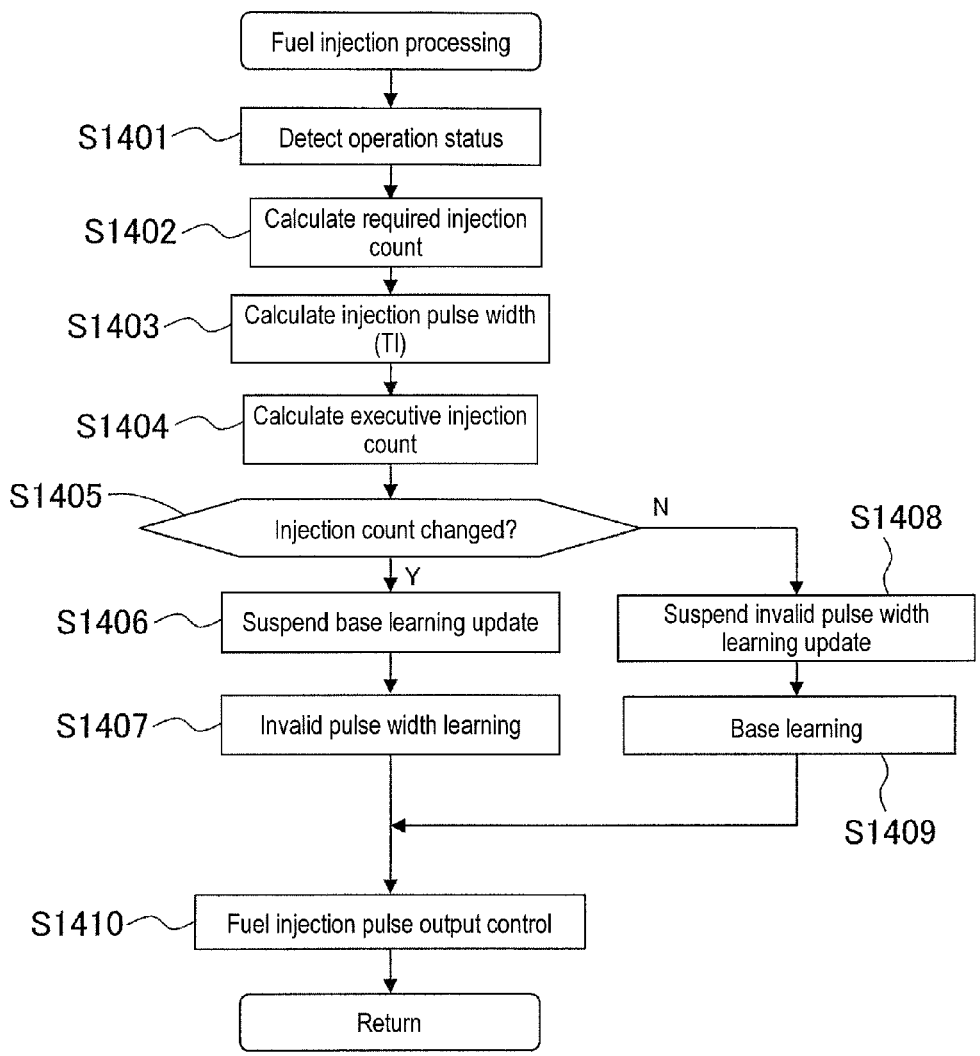
FIG. 14 is a control flow chart of a control system according to the present invention.

Next, FIG. 14 is a control flow chart of a control system according to the present embodiment.

In the control of an internal combustion engine control system, first, an operation status of an internal combustion engine is detected (S1401), then a required injection count of an injector is calculated based on the internal combustion engine operation status (S1402), and a fuel injection pulse width per time (TI) is calculated based on the internal combustion engine operation status and the required injection count (S1403). Next, as shown in FIG. 14, after a predetermined period following the calculation, an executive fuel injection count is calculated based on the required injection count and executed (S1404). Then, whether a fuel injection count has been changed by the execution of the fuel injection or not is determined (S1405), and, when the fuel injection count has been changed, update of Base learning which is valid pulse width learning of an injector is suspended (S1406) and invalid pulse width learning of an injector is carried out (S1407). Also, when determining that the fuel injection count has not been changed in S1405, update of invalid pulse width learning of the injector is suspended (S1408) and Base learning which is valid pulse width learning of the injector is carried out (S1409). After being reflected such learning of a valid pulse and an invalid pulse of the injector, a fuel injection pulse is outputted to the injector (S1410).

Regarding the above-described pulse width learning, with reference to FIGS. 15 to 17, invalid pulse width learning of the present invention according to variation factors will be described.

Figure 15:
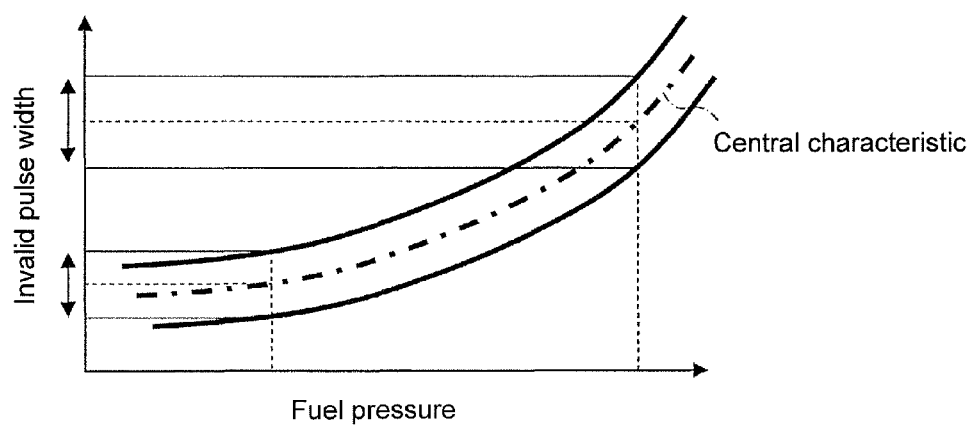
FIG. 15 is a diagram illustrating relation between a fuel pressure applied to an injector and invalid pulse width of the injector.
Figure 16:
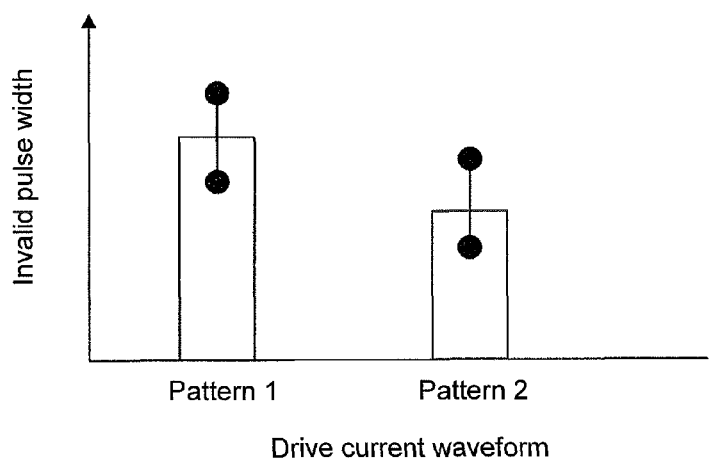
FIG. 16 is a diagram illustrating relation between a pattern of a driving current waveform for driving an injector and invalid pulse width of the injector.

First, FIGS. 15 and 16 indicate relation between: each of a fuel pressure applied to an injector and a pattern (profile) of a driving current waveform for driving the injector, which are potential variation factors; and invalid pulse width of the injector.

The horizontal axis of FIG. 15 indicates a fuel pressure, and the vertical axis invalid pulse width of an injector. The dashed-dotted line indicates a central characteristic of the fuel pressure sensor 26 (refer to FIG. 1) for detecting a fuel pressure, and the solid lines above and below the dashed-dotted line indicate characteristic variations of the fuel pressure sensor. As shown in the figure, because a variation of invalid pulse width increases along with increase of a fuel pressure, and thus a variation of invalid pulse width of an injector changes according to a detected value of a fuel pressure, by learning invalid pulse width of the injector using a fuel pressure as a parameter, the learning accuracy can be improved.

Moreover, when a pattern of an injector driving current waveform shown in FIG. 4 is changed, a valve-open time (Td-OP-a) and a valve-close time (Td-CL-a) of an injector are changed. Further, a current value of an injector driving current waveform has a variation within a given range due to a variation of a drive circuit. Therefore, as shown in FIG. 16, invalid pulse width of an injector is changed according to a pattern of an injector driving current waveform, and, further, by a variation specific to each current waveform, invalid pulse width of an injector also has a specific variation. Accordingly, as is the case with a fuel pressure applied to an injector, by learning invalid pulse width of the injector using a pattern of an injector driving current waveform as a parameter, its learning accuracy can be improved further.

Figure 17:
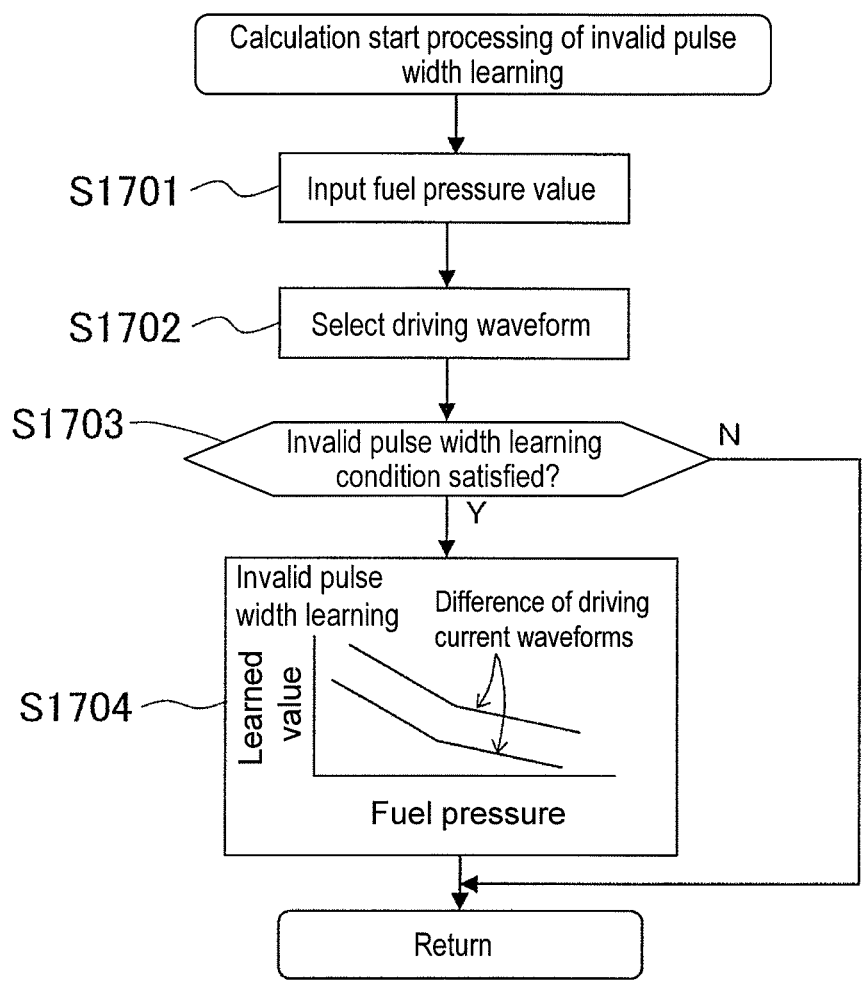
FIG. 17 is a flow chart of invalid pulse width learning according to a variation factor.

FIG. 17 is a flow chart of invalid pulse width learning in the case where a variation factor such as a fuel pressure and a pattern of an injector driving current waveform as described above are used as a parameter.

First, input processing of a fuel pressure value of the fuel pressure sensor 26 (refer to FIG. 1) of an internal combustion engine is performed (S1701), and selection of a current waveform for driving an injector (by the driving waveform calculation means 28b in FIG. 2) is carried out (S1702). Next, whether a condition for fuel injection invalid pulse width learning has been satisfied by a change in a fuel injection count and the like as described above or not is determined (S1703), and, when the condition has been satisfied, invalid pulse width learning of an injector is carried out using a fuel pressure and/or a pattern of an injector driving current waveform as a parameter (S1704).

Meanwhile, regarding input processing of the fuel pressure sensor 26 of an internal combustion engine shown in FIG. 17 and selection of a current waveform for driving an injector, only either one of them can be performed. In addition, when the both of them are carried out, the order of them can be changed. Further, when there are variation factors other than the above items, they can be included in the flow of invalid pulse width learning accordingly.

In addition, the learning flow shown in FIG. 17 can be modified accordingly, and, for example, whether a condition for fuel injection invalid pulse width learning is satisfied or not can be determined first, and after that, input processing of variation factors or the like is performed, and learning of invalid pulse width can be performed using them as a parameter.

Figure 18:
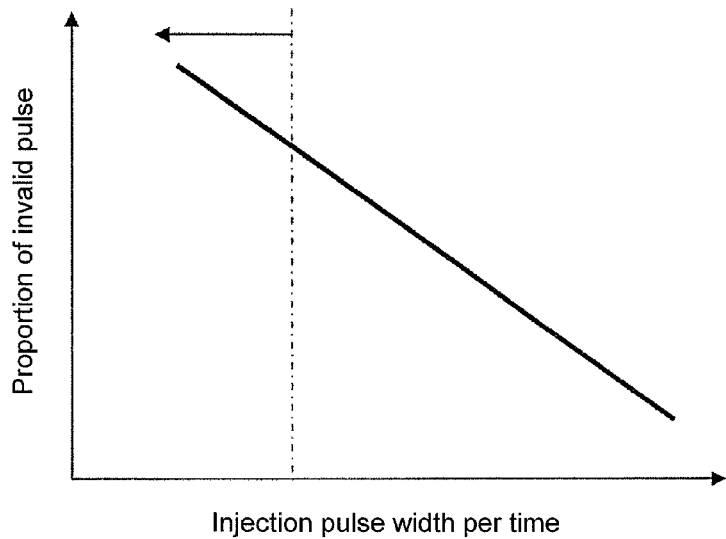
FIG. 18 is a diagram illustrating relation between a fuel injection pulse width per time and the proportion of invalid pulse width to it.
Figure 19:
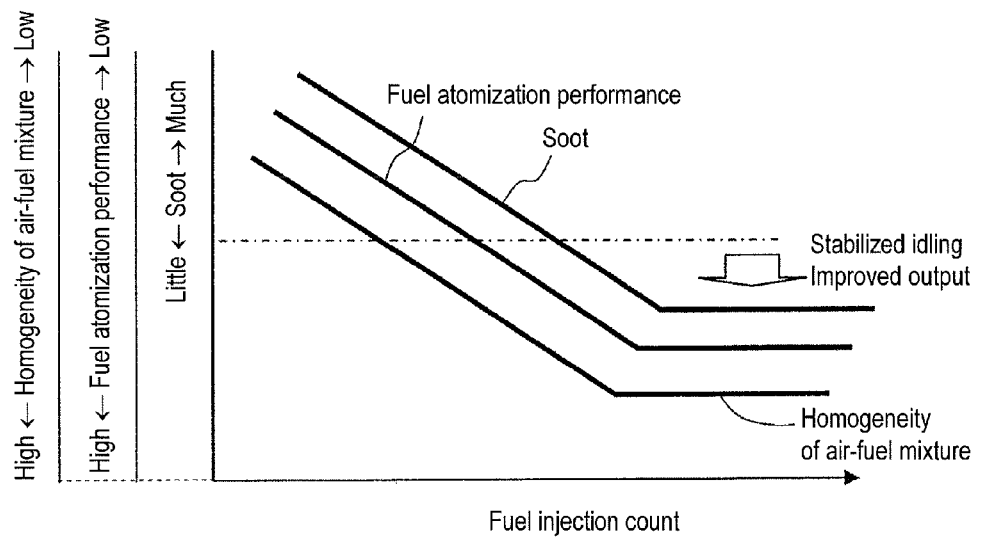
FIG. 19 is a diagram illustrating relation between the number of times of fuel injection and performance of an internal combustion engine.

Then, referring to FIG. 18, a condition with which invalid pulse width learning is performed will be described. The figure is a diagram illustrating relation between a fuel injection pulse width per time and a proportion of an invalid pulse width to it.

As described in FIG. 10(B), because, the larger a proportion of an invalid pulse to a fuel injection pulse per time, the more significantly influence of an invalid pulse variation emerges on an air-fuel ratio of an internal combustion engine, it is desirable that, in invalid pulse width learning of fuel injection, a proportion of an invalid pulse to a fuel injection pulse width is a predetermined value or more. That is, it is preferred to perform invalid pulse width learning when a fuel injection pulse width (injection quantity ratio) per time is not more than a predetermined value. Accordingly, as shown, by permitting invalid pulse width learning of an injector only when a fuel injection pulse width per time is within a predetermined range, it is possible to optimize such invalid pulse width learning and, further, simplify it.

In the above, the embodiments of the present invention have been described in detail. According to the present invention, when performing fuel injection of an injector for a plurality of times according to an operation status of an internal combustion engine, it becomes possible to control a fuel injection quantity accurately by learning a variation of the injector, and as a result, it is possible to provide stable air-fuel ratio control of an internal combustion engine and to avoid degradation of exhaust gas emission and operability of the internal combustion engine.

Meanwhile, the present invention is not limited to the embodiments described above, and various modifications are included in it. For example, the above-described embodiments are described in detail for convenience of explanation and good understanding of the present invention, and thus the present invention is not limited to one having all the described configurations. Additionally, it is possible to replace a part of the configuration of a certain embodiment with a configuration of another embodiment, and it is also possible to add a configuration of a certain embodiment to the configuration of another embodiment. Further, regarding a part of the configuration of each embodiment, addition of another configuration, its deletion, and replacement with another configuration can be performed.

Yet further, the control lines and information lines considered as necessary for the purpose of explanation are indicated, it is not necessary the case that all control lines and information lines needed as a product are indicated. In practice, it may be considered that almost all of configurations are connected with each other.

DESCRIPTION OF SYMBOLS

1 Internal combustion engine
2 Piston
3 Intake valve
4 Exhaust valve
5 Injector
6 Spark plug
7 Sparking coil
8 Water temperature sensor
9 ECU (Engine Control Unit)
10 Intake pipe
11 Exhaust pipe
12 Three-way catalyst
13 Oxygen sensor
14 EGR valve
15 Collector
16 Crank angle sensor
18 EGR path
19 Throttle butterfly
20 Air flow meter
21 Combustion chamber
22 Accelerator open-rate sensor
23 Fuel tank
24 Low pressure fuel pump
25 High pressure fuel pump
26 Fuel pressure sensor
27 Fuel injection control system
28 Driving control means

What is claimed is:

1. A control system of an internal combustion engine having an injector for making a valve operate and inject fuel by applying an excitation current to a coil, and injecting the fuel directly to a combustion chamber, the control system comprising: air-fuel ratio detecting means for detecting an air-fuel ratio of the internal combustion engine; operation status detecting means for detecting an operation status of the internal combustion engine; injection count setting means for setting a fuel injection count based on the operation status of the internal combustion engine detected by the operation status detecting means; driving control means for performing driving control of a pulse width of the excitation current for valve-opening driving the injector; and pulse width learning means for learning the pulse width;

the driving control means calculating a valid pulse width corresponding to a fuel injection quantity injected into the combustion chamber and an invalid pulse width corresponding to a valve opening delay and a valve closing delay of the injector;

the pulse width learning means learning, based on the operation status of the internal combustion engine, an amount of change in the air-fuel ratio, which occurs as a result of a change in the fuel injection count, as the invalid pulse width, and maintaining the amount of change in the air-fuel ratio as a constant invalid pulse width until a further change in the fuel injection count; and the injector injecting the fuel directly to the combustion chamber based upon the valid pulse width and the invalid pulse width.

2. The internal combustion engine control system according to claim 1, wherein a fuel injection count is not changed after the fuel injection count has been set by the injection count setting means until beginning of learning of the invalid pulse width of the injector.

3. The internal combustion engine control system according to claim 2, wherein, when a fuel injection count after a change of a fuel injection count is larger than a fuel injection count before the change, the fuel injection count is not changed until beginning of learning of the invalid pulse width of the injector.

4. The internal combustion engine control system according to claim 1, wherein, when a pulse width of the excitation current per time at a time of injecting fuel for a plurality of times in a dividing manner into the combustion chamber is within a predetermined range, the pulse width learning means learns the invalid pulse width.

5. The internal combustion engine control system according to claim 1, wherein, when each injection quantity ratio of the invalid pulse width to the fuel injection pulse width at a time of injecting fuel for a plurality of times in a dividing manner into the combustion chamber is within a predetermined range, the pulse width learning means learns the invalid pulse width.

6. The internal combustion engine control system according to claim 1, wherein the pulse width learning means learns the invalid pulse width using at least one of a fuel pressure applied to the injector of the internal combustion engine and a pattern of an excitation current applied to a coil of the injector as a parameter.

7. The internal combustion engine control system according to claim 1, wherein the invalid pulse width to be learned by the pulse width learning means is limited within a setting range set in advance.

8. The internal combustion engine control system according to claim 6, wherein the pulse width learning means learns each of the valid pulse width and the invalid pulse width based on the air-fuel ratio detected by the air-fuel ratio detecting means, and wherein the pulse width learning means learns an amount of change in the air-fuel ratio when a fuel injection count has been changed as the invalid pulse width of the injector, and learns an amount of change in the air-fuel ratio when a fuel injection count has not been changed as the valid pulse width of the injector.

9. The internal combustion engine control system according to claim 8, wherein learning updates of the valid pulse width and the invalid pulse width of the injector are carried out at different times, and, after either one of the updates is suspended, the other update is carried out.

10. The internal combustion engine control system according to claim 1, further comprising: injection quantity learning means for learning, based on the air-fuel ratio detected by the air-fuel ratio detecting means, an injection quantity of the injector using a learning map divided into a plurality of areas for each operation status; and the injection quantity learning means learning an injection quantity of the injector by setting each area of the learning map according to the fuel injection count set based on an operation status of the internal combustion engine, or by using a different learning map for each fuel injection count.

\* \* \* \* \*